United States Patent
Patil et al.

(10) Patent No.: US 11,629,621 B2
(45) Date of Patent: Apr. 18, 2023

(54) SYSTEM FOR A COMBINED SPARK ARRESTOR AND MUFFLER ASSEMBLY

(71) Applicant: Transportation IP Holdings, LLC, Norwalk, CT (US)

(72) Inventors: Abhijit Eknath Patil, Bangalore (IN); Samir Vikas Joshi, Bangalore (IN); Sandeep Kanzal Venkatesha, Bangalore (IN); Prabhakaran Selvaraj, Bangalore (IN)

(73) Assignee: Transportation IP Holdings, LLC, Norwalk, CT (US)

(*) Notice: Subject to any disclaimer, the term of this patent is extended or adjusted under 35 U.S.C. 154(b) by 0 days.

(21) Appl. No.: 17/360,932

(22) Filed: Jun. 28, 2021

(65) Prior Publication Data

US 2021/0404359 A1 Dec. 30, 2021

Related U.S. Application Data

(60) Provisional application No. 63/045,325, filed on Jun. 29, 2020.

(51) Int. Cl.
| | |
|---|---|
| *F01N 3/06* | (2006.01) |
| *F01N 1/24* | (2006.01) |
| *F01N 3/00* | (2006.01) |
| *F01N 13/18* | (2010.01) |
| *F01N 1/08* | (2006.01) |

(52) U.S. Cl.
CPC ............... *F01N 3/06* (2013.01); *F01N 1/088* (2013.01); *F01N 1/24* (2013.01); *F01N 3/005* (2013.01); *F01N 13/1811* (2013.01); *F01N 2230/06* (2013.01); *F01N 2590/08* (2013.01)

(58) Field of Classification Search
CPC ..... F01N 3/06; F01N 13/1811; F01N 2230/06
See application file for complete search history.

(56) References Cited

U.S. PATENT DOCUMENTS

| | | | | |
|---|---|---|---|---|
| 3,545,179 | A * | 12/1970 | Nelson | F01N 1/088 55/455 |
| 3,757,892 | A * | 9/1973 | Raudman, Jr. | F01N 3/037 181/256 |
| 5,969,299 | A * | 10/1999 | Yamaguchi | F01N 1/089 181/227 |
| 6,968,922 | B2 * | 11/2005 | Kawamata | F01N 1/083 55/DIG. 20 |
| 8,091,683 | B2 * | 1/2012 | Tabata | F01N 3/06 181/227 |
| 2004/0206073 | A1 * | 10/2004 | Yamamoto | F01N 1/16 60/297 |
| 2015/0114750 | A1 * | 4/2015 | Yoshida | F01N 13/0097 181/228 |

* cited by examiner

*Primary Examiner* — Jonathan R Matthias
(74) *Attorney, Agent, or Firm* — McCoy Russell LLP

(57) ABSTRACT

Systems and methods are provided for a combined spark arrestor and muffler assembly. In one example, a system may include a combined housing, the combined housing including a spark arrestor portion including a plurality of stator fins, and a muffler portion including acoustic packing, the muffler portion fluidically coupled to the spark arrestor portion via a first sliding joint and a second sliding joint. In this way, a single component of a vehicle exhaust system may reduce sparks and/or carbon deposits in exhaust gas, while also reducing exhaust noise.

9 Claims, 11 Drawing Sheets

SYSTEM FOR A COMBINED SPARK ARRESTOR AND MUFFLER ASSEMBLY

CROSS REFERENCE TO RELATED APPLICATIONS

The present application claims priority to U.S. Provisional Application No. 63/045,325, entitled "SYSTEM FOR A COMBINED SPARK ARRESTOR AND MUFFLER ASSEMBLY", and filed on Jun. 29, 2020. The entire contents of the above-listed application are hereby incorporated by reference for all purposes.

BACKGROUND

Technical Field

Embodiments of the subject matter disclosed herein relate to a combined spark arrestor and muffler for a locomotive engine.

Discussion of Art

Locomotive systems may be equipped with each of a spark arrestor and a muffler to meet regulatory standards. For example, it may be desirable to include spark arrestors to prevent excess flammable material in locomotive exhaust. Further, it may be desirable to include mufflers to decrease a noise level generated by hot engine exhaust moving through the locomotive exhaust system. For these reasons, providing a spark arrestor and a muffler for a locomotive, such as a shunting locomotive, may increase customer satisfaction. In some examples, a spark arrestor may be separate from a muffler in an engine system. For example, a spark arrestor may be manufactured and installed separately from a muffler, so that each of the spark arrestor and the muffler is coupled to the engine separately via clamping arrangements and/or bolted joints. However, including separate spark arrestors and mufflers in an engine system may increase weight, complexity, cost, and maintenance difficulty, and decrease operator visibility. Alternative spark arrestor and muffler configurations may therefore be desirable.

BRIEF DESCRIPTION

In one embodiment, a system, may include a combined housing, including a spark arrestor portion, the spark arrestor portion including a plurality of stator fins, and a muffler portion, the muffler portion including acoustic packing, wherein the muffler portion is fluidically coupled to the spark arrestor portion via a first sliding joint and a second sliding joint.

BRIEF DESCRIPTION OF THE DRAWINGS

FIGS. 2-9 are shown approximately to scale, however, other dimensions may be used.

DETAILED DESCRIPTION

Figure 1:
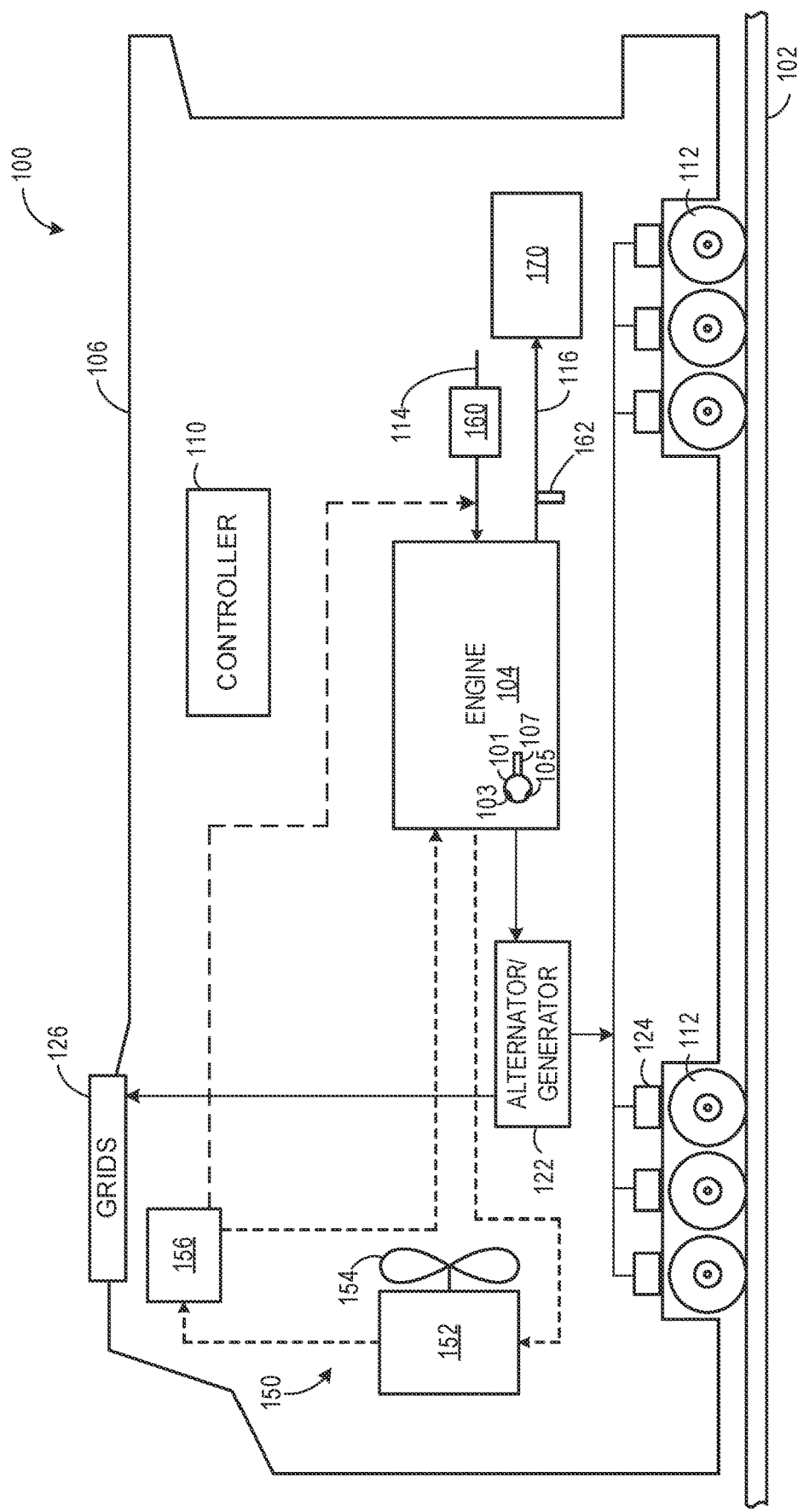
FIG. 1 shows a schematic diagram of a vehicle with an engine including a combined spark arrestor and muffler assembly.

Embodiments of the invention are disclosed in the following description, and may relate to system for a combined spark arrestor and muffler. As one example, the combined spark arrestor and muffler may include a combined housing including a spark arrestor portion and a muffler portion, the spark arrestor portion including a plurality of stator fins, and the muffler portion including acoustic packing. For example, the combined housing may include an internal cavity, the plurality of stator fins positioned therein, a cylindrical outer casing, a spark tray coupled to the cylindrical outer casing, and a drain port fluidly coupling the internal cavity to an external surface of the cylindrical outer casing.

By including a combined spark arrestor and muffler assembly, rather than a standalone spark arrestor and a standalone muffler, for example, undesirable emissions may be reduced, while a cost and complexity of a system may be decreased. To compensate for differing thermal stresses between the spark arrestor portion and the muffler portion of the combined spark arrestor and muffler assembly, the combined spark arrestor and muffler may include an external sliding joint and an internal sliding joint. For example, including the internal sliding joint and the external sliding joint may allow a single assembly to house a spark arrestor portion and a muffler portion with reduced thermal stress. The external sliding joint and the internal sliding joint may reduce thermal stresses on the combined spark arrestor and muffler during engine operation in which temperatures may fluctuate significantly depending on the engine load and/or environmental conditions. For example, reducing thermal stresses on the combined spark arrestor and muffler may reduce repair costs for the combined spark arrestor and muffler. Further, by mounting the combined spark arrestor and muffler inside an engine cab, for example, rather than including a spark arrestor outside of the engine cab, operator visibility may be increased, which may increase customer satisfaction. For example, including the combined spark arrestor and muffler inside the engine cab may address engine height so that operator visibility is not impinged upon by engine components. Accordingly, in one example, a vehicle system (e.g., a rail vehicle system) may include a combined spark arrestor and muffler assembly in the exhaust system for treating exhaust gas from the engine.

Embodiments of the system described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, rail vehicles, and other off-highway vehicles (OHVs). For clarity of illustration, a rail vehicle such as a locomotive may be provided as an example of a mobile platform supporting a system incorporating an embodiment of the system. For example, the mobile platform may be a shunter locomotive with a diesel engine, as will be elaborated below.

FIG. 1 shows an embodiment of a system in which a combined spark arrestor and muffler may be installed. Specifically, FIG. 1 shows a block diagram of an embodiment of a vehicle system 100. In the illustrated example, the engine is coupled to a vehicle and is depicted as a locomotive 106. The vehicle may run on a road 102 via a plurality of wheels 112. As depicted, the locomotive includes an engine 104. The engine includes a plurality of cylinders 101 (only one representative cylinder shown in FIG. 1) that each include at least one intake valve 103, at least one exhaust valve 105, and at least one fuel injector 107. Each intake valve, exhaust valve, and fuel injector may include an actuator that may be actuated via a signal from a controller 110 of the engine. In other non-limiting embodiments, the engine may be in a stationary platform. Suitable stationary platforms may include a power-plant application. Other suitable vehicles may include a marine vessel, mining or industrial equipment, on-road vehicles, and off-highway vehicle propulsion systems.

The engine receives intake air for combustion from an intake passage 114. The intake passage 114 includes an air filter 160 that filters air from outside of the locomotive. Exhaust gas resulting from combustion in the engine is supplied to an exhaust passage 116. For example, the exhaust passage 116 may include an exhaust gas sensor 162, which may monitor a temperature and/or an air-fuel ratio of the exhaust gas, and which may be coupled to the controller to provide monitoring data thereto. Exhaust gas flows through the exhaust passage and an exhaust system of the locomotive. For example, the exhaust passage may be coupled to a combined spark arrestor and muffler assembly 170 in order to decrease sparks and/or carbon deposits in the exhaust and to reduce exhaust noise. For example, the combined spark arrestor and muffler assembly may be a single engine component providing the function of a spark arrestor and the function of a muffler, and coupled (e.g., fluidly coupled) in the exhaust system of a locomotive. As an example, a spark arrestor portion of the combined spark arrestor and muffler assembly may reduce the presence of carbon debris in the exhaust. Further, the muffler portion of the combined spark arrestor and muffler assembly may reduce exhaust gas noise, such as dampening the acoustic loudness generated by exhaust pressure. For example, the muffler portion may include acoustic insulation (e.g., such as acoustic packing) and/or resonance chambers for decreasing exhaust gas noise. A combined spark arrestor and muffler, such as may be used as combined spark arrestor and muffler assembly 170 of FIG. 1, and methods therefor, will be described further with respect to FIGS. 2-10.

The vehicle system may include an aftertreatment system coupled in the exhaust passage. In one embodiment, the aftertreatment system may include one or more emission control devices. Such emission control devices may include a selective catalytic reduction (SCR) catalyst, a three-way catalyst, a NOx trap, or various other devices or exhaust aftertreatment systems. In another embodiment, the aftertreatment system may additionally or alternatively include a diesel oxidation catalyst (DOC) and a diesel particulate filter (DPF).

Further, combustion in the cylinder(s) drives rotation of a crankshaft (not shown). In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally or alternatively combust fuel including gasoline, kerosene, natural gas, ethanol, biodiesel, or other petroleum distillates of similar density through compression ignition (and/or spark ignition).

A suitable locomotive may be a diesel-electric locomotive. Suitable diesel-electric locomotives may include mainline haulers, heavy haul freight haulers, passenger rail vehicles, shunters, switchers, and the like. The diesel-electric locomotive may include other power sources, such as hybrid electric (batteries), fuel cells, hydrogen engines, and the like. While diesel is an example fuel, other fuels may be used, such as those described hereinabove.

As depicted in FIG. 1, the engine is coupled to an electric power generation system that includes an alternator/generator 122. For example, the engine may be a diesel and/or natural gas engine that generates a torque output that is transmitted to the alternator/generator, which is mechanically coupled to the crankshaft, as well as to at least one of the plurality of wheels to provide motive power to propel the locomotive. The alternator/generator may produce electrical power that may be stored and applied for subsequent propagation to a variety of downstream electrical components. In one example, the alternator/generator may be electrically coupled to an electrical system 126. The electrical system may include one or more electrical loads configured to run on electricity generated by the alternator/generator, such as vehicle headlights, a cabin ventilation system, and an entertainment system, and may further include an energy storage device (e.g., a battery) which may be charged by electricity generated by the alternator/generator. In some examples, the vehicle may be a diesel-electric vehicle, and the alternator/generator may provide electricity to one or more electric motors 124 to drive the wheels.

As depicted in FIG. 1, the vehicle system may include a thermal management system 150 (e.g., an engine cooling system). The cooling system circulates coolant (e.g., water, glycol, etc.) through the engine to absorb waste engine heat and distribute the heated coolant to a heat exchanger, such as a radiator 152 (e.g., a radiator heat exchanger). A suitable coolant may be water. A fan 154 may be coupled to the radiator to maintain an airflow through the radiator when the vehicle is moving slowly or stopped while the engine is running. In some examples, a speed of the fan may be controlled by the controller. Coolant that is cooled by the radiator may enter a tank (not shown). The coolant may then be pumped by a water, or coolant, pump 156 back to the engine or to another component of the vehicle system.

The controller may control various components related to the locomotive vehicle system. As an example, various components of the vehicle system may be coupled to the controller via a communication channel or data bus. In one example, the controller may include a computer control system. The controller may additionally or alternatively include a memory holding non-transitory computer readable storage media (not shown) including code for enabling on-board monitoring and control of locomotive operation. In some examples, the controller may include more than one controller each in communication with one another, such as a first controller to control the engine and a second controller to control other operating parameters of the vehicle (such as engine load, engine speed, brake torque, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the engine and/or vehicle, may receive signals from a variety of engine sensors, as further elaborated herein, in order to determine operating parameters and operating conditions, and correspondingly adjust various engine actuators to control operation of the engine and/or the vehicle. For example, the controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller may control the engine and/or the vehicle by sending commands to various components such as the one or more electric motors, the alternator/generator, the fuel injectors, valves, the coolant pump, or the like. For example, the controller may control the operation of a restrictive element (e.g., such as a valve) in the engine cooling system. Other actuators controllable by the controller may be coupled to various locations in the vehicle.

Figure 2:
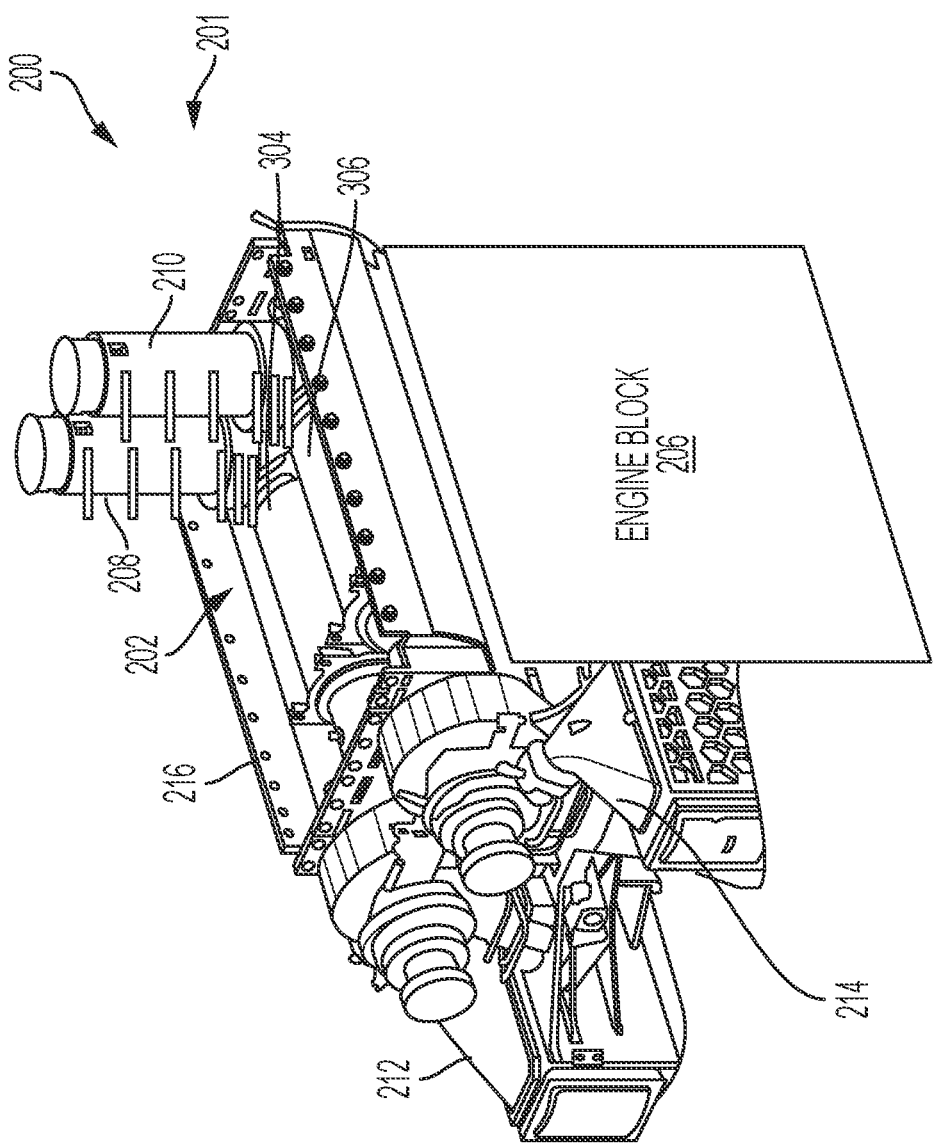
FIG. 2 shows an example engine system including a combined spark arrestor and muffler assembly, such as the combined spark arrestor and muffler assembly of FIG. 1.
Figure 2:
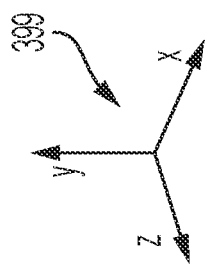
Figure 3:
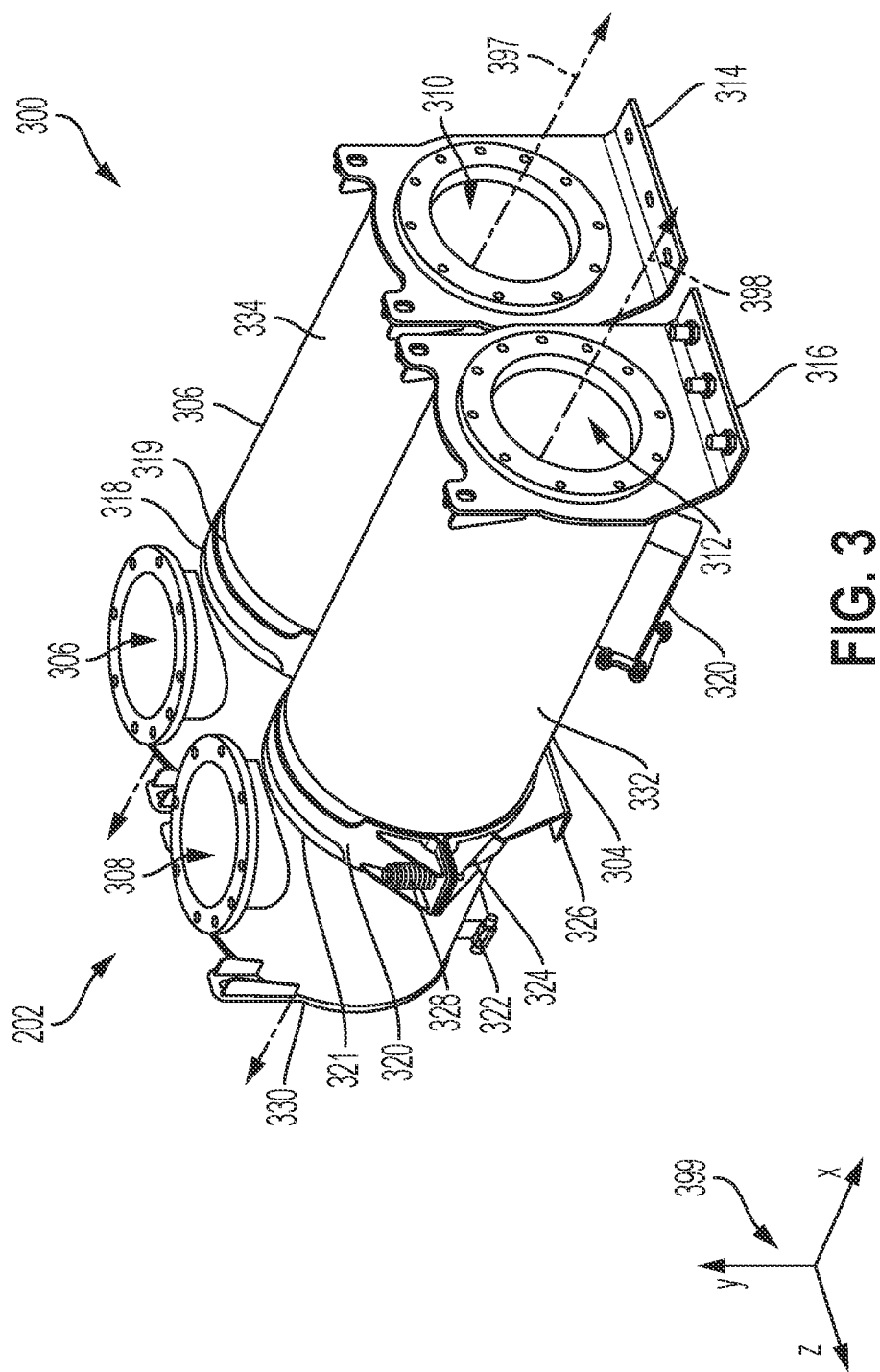
FIG. 3 shows an isolated view of the combined spark arrestor and muffler assembly of FIG. 2.
Figure 4A:
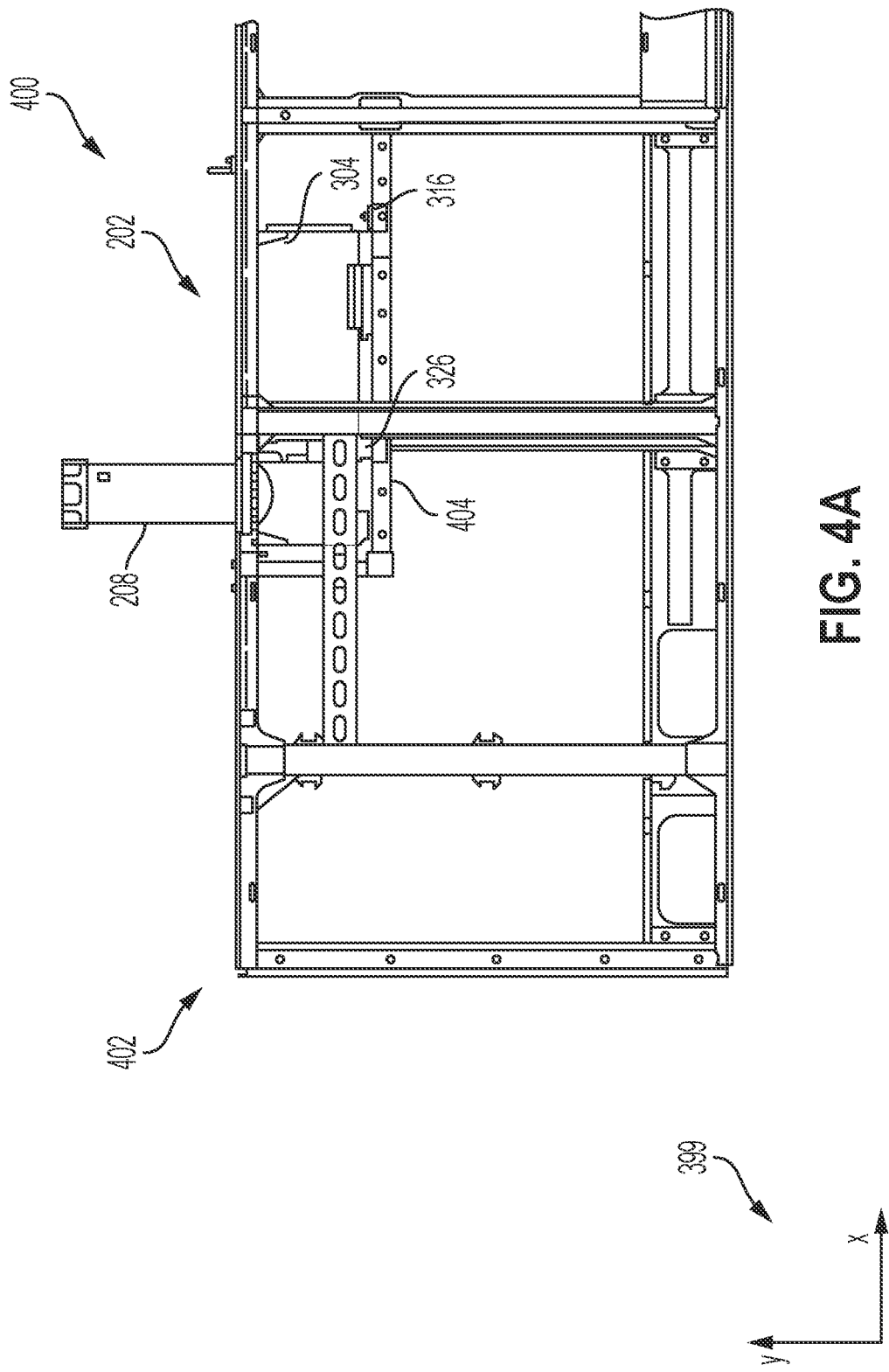
FIG. 4A shows a first view of the combined spark arrestor and muffler assembly coupled to a frame of a rail vehicle.
Figure 4B:
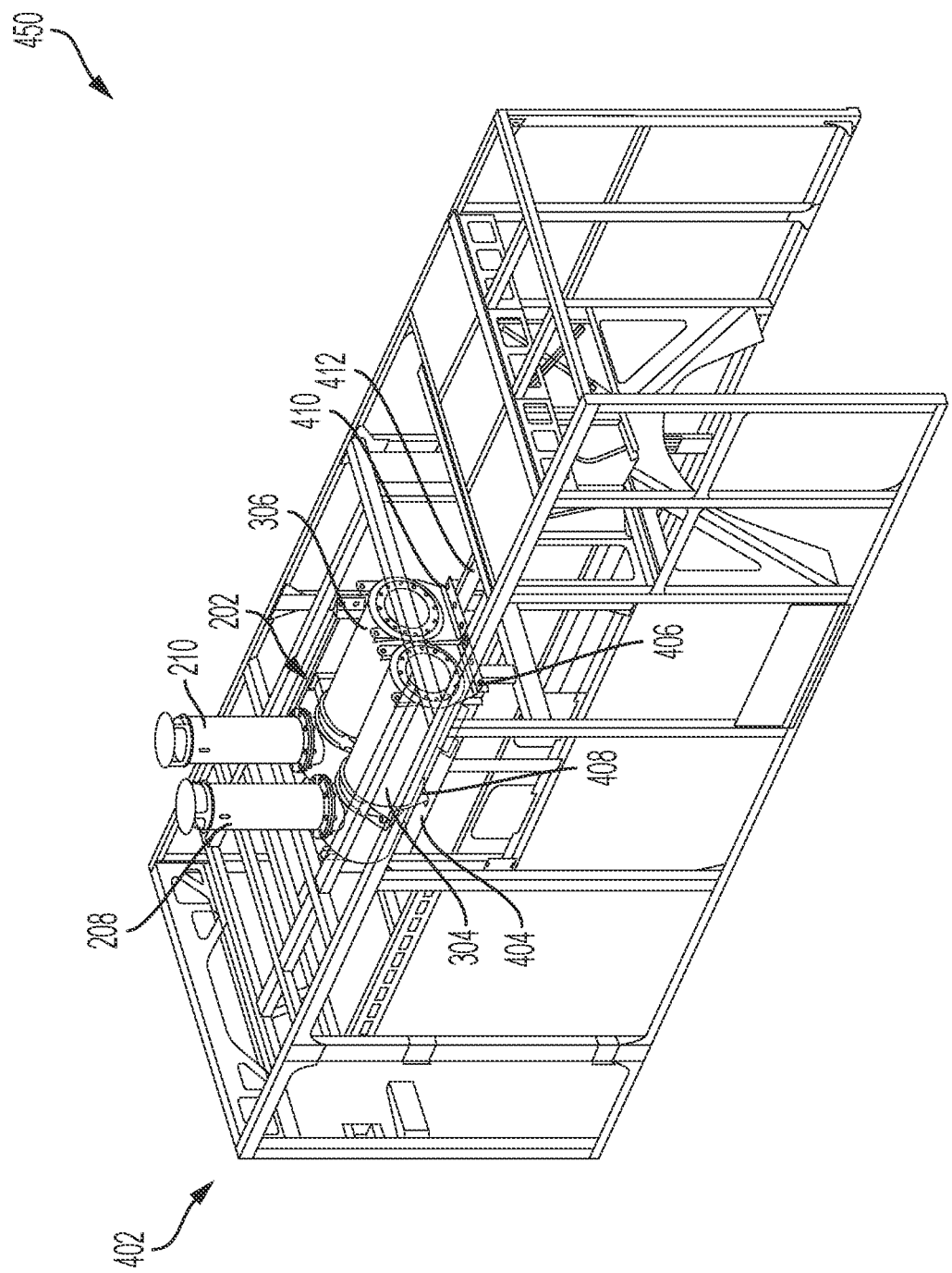
FIG. 4B shows a second view of the combined spark arrestor and muffler assembly coupled to the frame of the rail vehicle.
Figure 5:
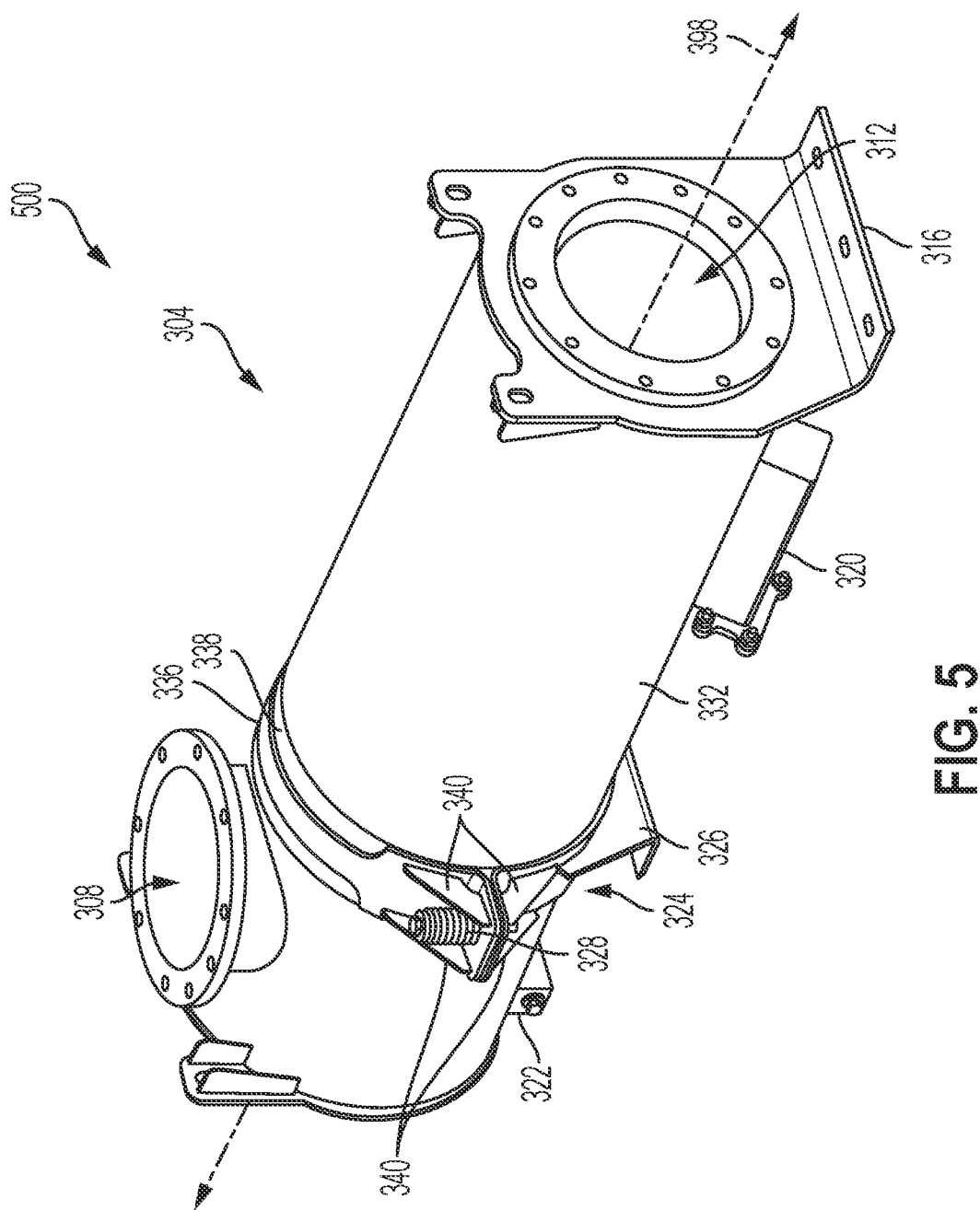
FIG. 5 shows a first isolated view of a first combined spark arrestor and muffler of the combined spark arrestor and muffler assembly of FIGS. 2-4B.
Figure 5:
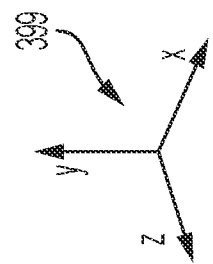
Figure 6:
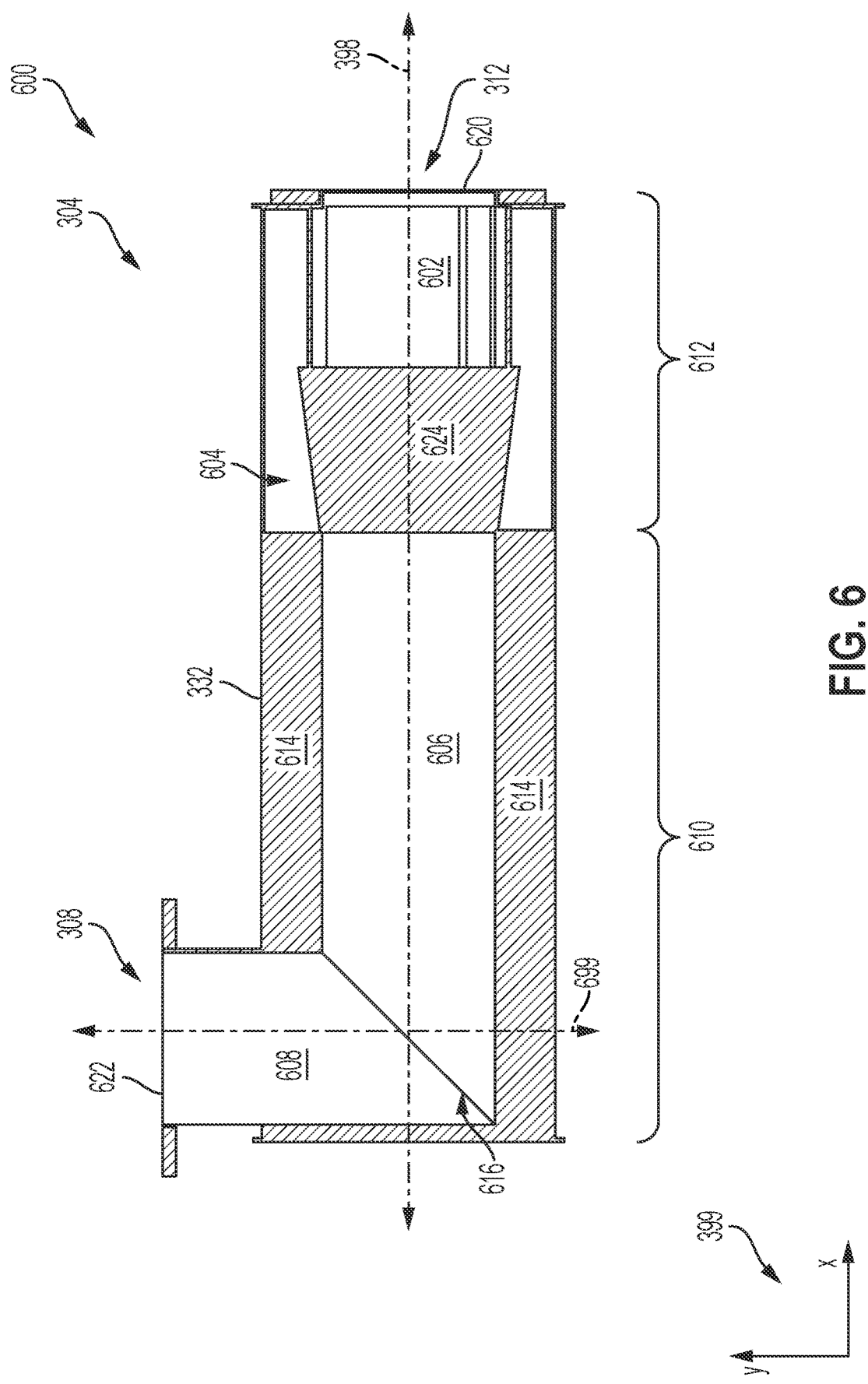
FIG. 6 shows a schematic, cross-sectional view of the first combined spark arrestor and muffler of the combined spark arrestor and muffler assembly.
Figure 7:
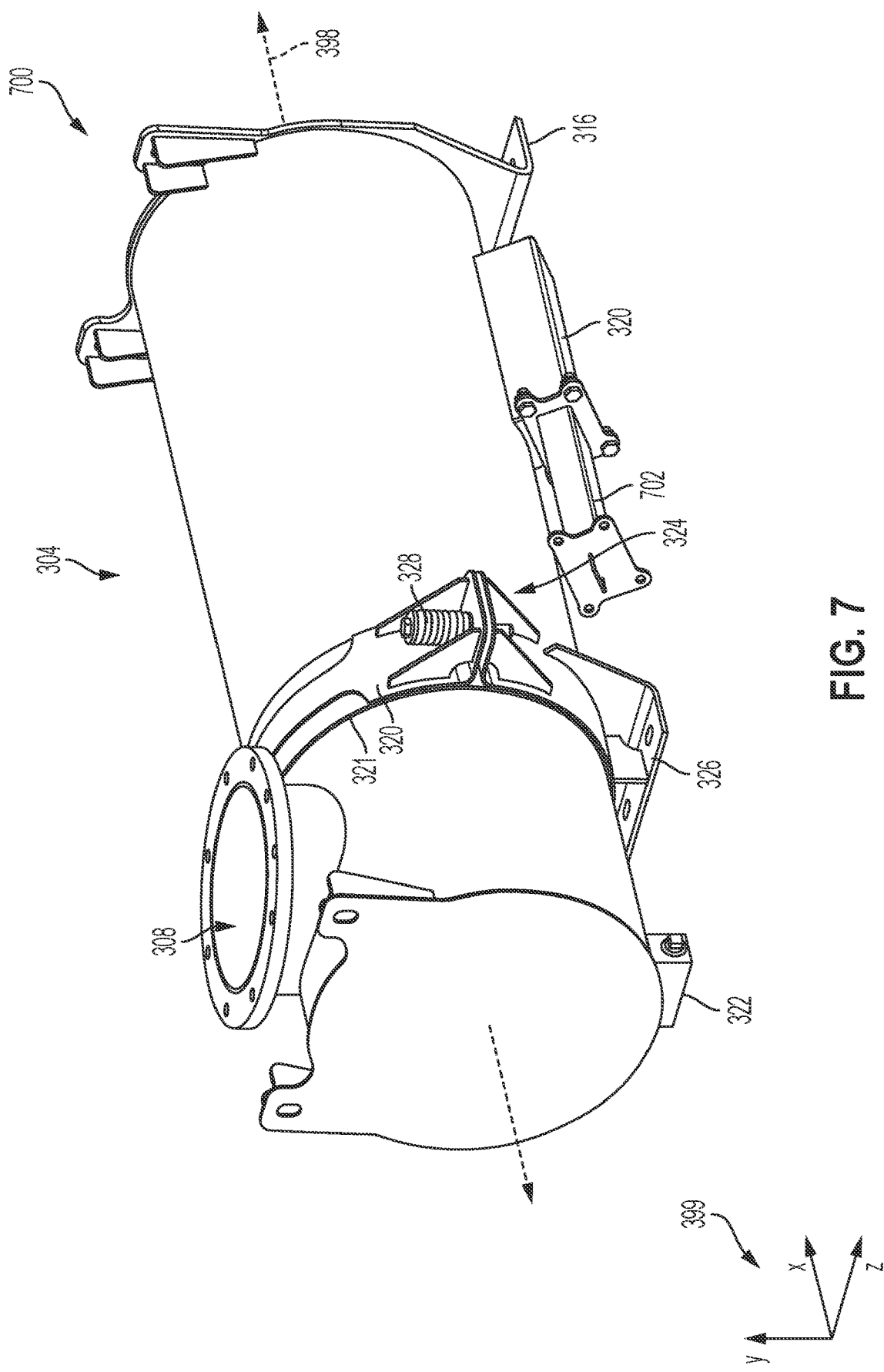
FIG. 7 shows a second isolated view of the first combined spark arrestor and muffler of the combined spark arrestor and muffler assembly.
Figure 8:
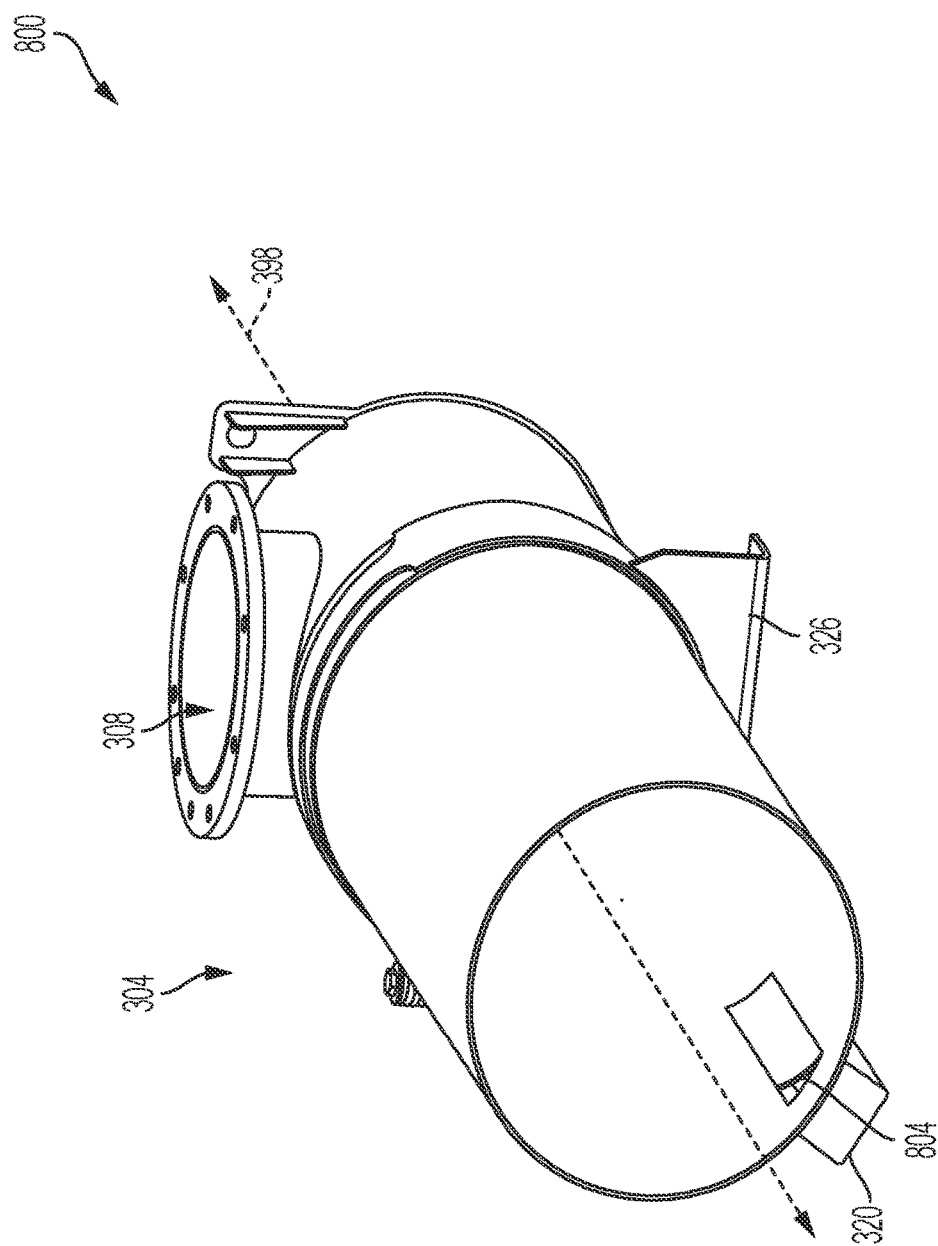
FIG. 8 shows a cross-sectional view of the first combined spark arrestor and muffler of the combined spark arrestor and muffler assembly.
Figure 9:
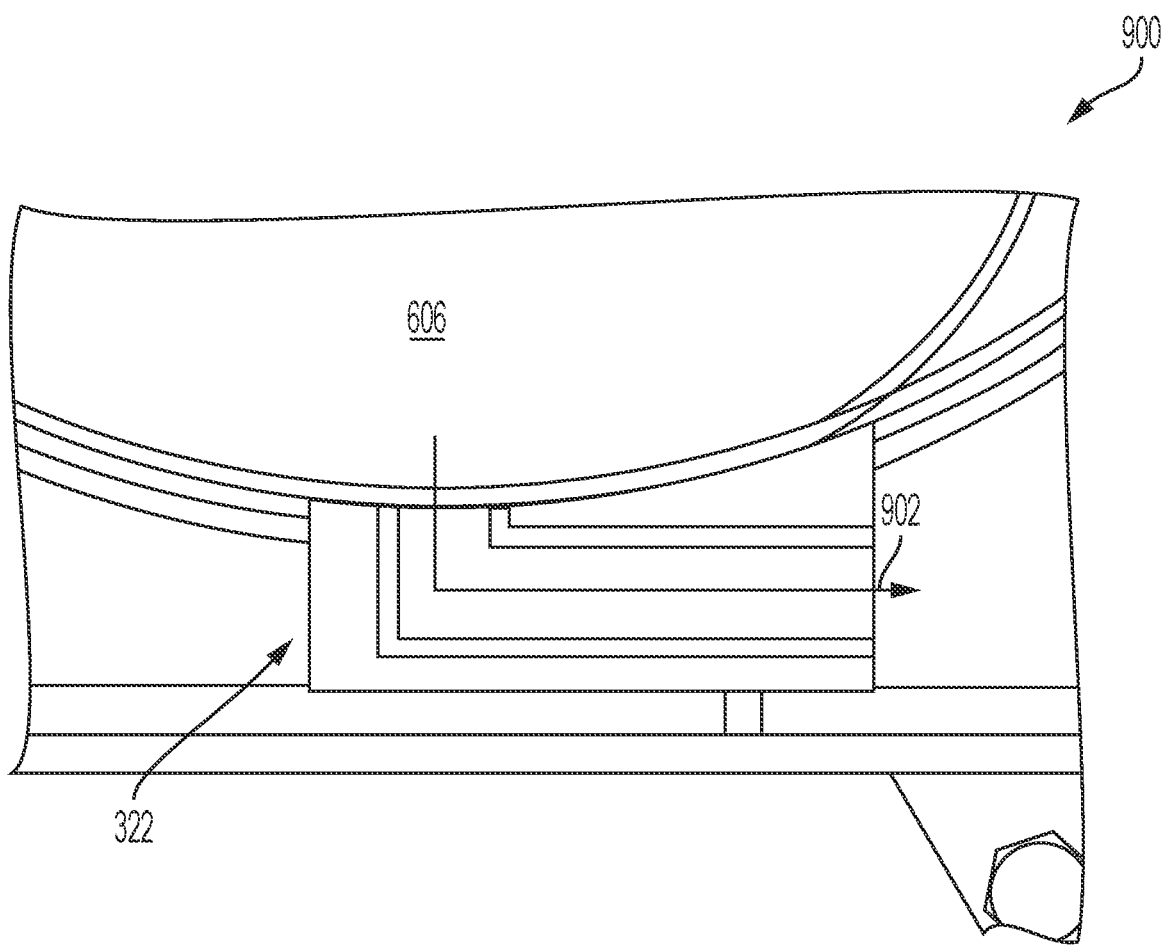
FIG. 9 shows a schematic, cross-sectional view of a drain port of the first combined spark arrestor and muffler of the combined spark arrestor and muffler assembly.

FIGS. 2-9 provide embodiments of a combined spark arrestor and muffler assembly 202 that may be included in a vehicle system, such as the vehicle system 100 of FIG. 1. For example, the combined spark arrestor and muffler assembly 202 may be one embodiment of the combined spark arrestor and muffler assembly 170 of the vehicle system 100 shown in FIG. 1. To demonstrate an engine system including a combined spark arrestor and muffler assembly, FIG. 2 shows a representative engine system including the combined spark arrestor and muffler assembly. The combined spark arrestor and muffler assembly may have a twin configuration, such that the combined spark arrestor and muffler assembly includes a first combined spark arrestor and muffler and a second combined spark arrestor and muffler, as shown in FIG. 3. For example, the first combined spark arrestor and muffler may be substantially identical to the second combined spark arrestor and muffler. Further, the combined spark arrestor and muffler assembly may be fixedly coupled to a rail vehicle frame such as shown in FIGS. 4A and 4B. The combined spark arrestor and muffler assembly may include an external sliding joint to reduce thermal stressed by allowing free expansion as shown in FIG. 5, and may further include an internal sliding joint to reduce thermal stresses, such as shown in FIG. 6. FIG. 6 further shows a schematic view of internal components of the first combined spark arrestor and muffler. FIGS. 7 and 8 highlight a spark tray of the first combined spark arrestor and muffler for collecting carbon deposits trapped by the spark arrestor portion of the first combined spark arrestor and muffler. Each of the first combined spark arrestor and muffler and the second combined spark arrestor and muffler may include a drain port for draining rain and other undesirable fluids from the combined spark arrestor and muffler assembly, such as shown in FIG. 9. The combined spark arrestor and muffler assembly may be operated according to a method 1000 of FIG. 10, such that exhaust gas from the engine flows through the combined spark arrestor and muffler assembly, with the spark arrestor portion reducing carbon deposits in the exhaust gas, and the muffler portion reducing exhaust gas noise, which may increase customer satisfaction.

FIGS. 2-9 will be described collectively, with like components numbered the same and not reintroduced between figures. FIGS. 2-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 399 are included in each of FIGS. 2-9 in order to compare the views and relative orientations described below. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 2, view 200 shows the combined spark arrestor and muffler assembly 202 coupled to an engine 201. For example, engine 201 may be engine 104 of FIG. 1, and may be used to provide motive power to a vehicle, such as a locomotive. For example, engine may be a diesel engine including an engine block 206 for housing a plurality of cylinders (not shown in FIG. 2). For example, fuel may be injected into each of the plurality of cylinders, and the fuel may be ignited via compression ignition. For example, exhaust gases from each cylinder of the plurality of cylinders may be released into a first exhaust passage (not shown) and a second exhaust passage (not shown). Further, the first exhaust passage may be coupled to a first turbocharger 214, and the second exhaust passage may be coupled to a second turbocharger 212. In this way, engine exhaust may be provided to the combined spark arrestor and muffler assembly.

As shown, combined spark arrestor and muffler assembly has a twin configuration, such that the combined spark arrestor and muffler assembly may include a first combined spark arrestor and muffler 304 and a second combined spark arrestor and muffler 306. For example, each of the first combined spark arrestor and muffler and the second combined spark arrestor and muffler may reduce carbon deposits in the exhaust gas and decrease exhaust gas noise. In other examples, the combined spark arrestor and muffler assembly may have a single configuration, so that the combined spark arrestor and muffler assembly may include a single combined spark arrestor and muffler. In still other examples, the combined spark arrestor and muffler assembly may include more than two combined spark arrestor and mufflers, such as three, four, and five combined spark arrestor and mufflers. Further, the first combined spark arrestor and muffler is coupled to a first exhaust stack 208, and the second combined spark arrestor and muffler is coupled to a second exhaust stack 210. The first and second exhaust stacks may allow exhaust gases to exit the engine system.

Next, FIG. 3 shows an isolated view 300 of the combined spark arrestor and muffler assembly, including the first combined spark arrestor and muffler and the second combined spark arrestor and muffler. As such, components previously introduced are similarly numbered in this and subsequent figures. As indicated by the reference axes 399, view 300 shows the combined spark arrestor and muffler assembly rotated about the y-axis such that foreshortened projections of each of the z- and x-axes are shown. Further, a central axis 398 of the first combined spark arrestor and muffler is parallel with the x-axis of the reference axes, and a central axis 397 of the second combined spark arrestor and muffler is parallel with the x-axis of the reference axes. For example, the central axis of the first combined spark arrestor and muffler is parallel with the central axis of the second combined spark arrestor and muffler. The first combined spark arrestor and muffler and the second combined spark arrestor and muffler may be substantially identical, and may share substantially identical components. For example, the first combined spark arrestor and muffler may include an (exhaust gas) inlet 312, an (exhaust gas) outlet 308, a first mounting bracket 316, and a second mounting bracket 326. Similarly, the second combined spark arrestor and muffler may include an (exhaust gas) inlet 310, an (exhaust gas) outlet 318, a third mounting bracket 314, and a fourth mounting bracket (not shown). As the first combined spark arrestor and muffler is substantially identical to the second combined spark arrestor and muffler, components of the first combined spark arrestor and muffler not shown in FIG. 3 may also be included in the second combined spark arrestor and muffler. For example, FIG. 3 further shows additional components of the first combined spark arrestor and muffler, including a spark tray 320 that collects soot from the spark arrestor portion and a drain port 322 that collects rain and other fluids. Although not shown in FIG. 3, the second combined spark arrestor and muffler may also include a spark tray and a drain port, for example. Components of the first combined spark arrestor and muffler may be identical to components of the second combined spark arrestor and muffler. However, components of the second combined spark arrestor and muffler may vary from components of the first combined spark arrestor and muffler.

As shown, each of the first combined spark arrestor and muffler and the second combined spark arrestor and muffler includes a hollow cylindrical body (e.g., a tube) coaxial with the central axis 398. For example, the first combined spark arrestor and muffler includes a hollow cylindrical body 332 coaxial with the central axis 398. Further, the second combined spark arrestor and muffler includes a hollow cylindrical body 334 coaxial with the central axis 397. Each hollow cylindrical body may have a thickness, and additional components may be internally coupled to each of the first combined spark arrestor and muffler and the second combined spark arrestor and muffler but not shown in FIG. 3. For example, components may be coupled to an internal cavity of each hollow cylindrical body. External components of the first combined spark arrestor and muffler may be coupled to the cylindrical body, such as the inlet 312, the first mounting bracket 316, the second mounting bracket 326, and the outlet 308. The first combined spark arrestor and muffler includes a back plate 330.

Each of the first combined spark arrestor and muffler and the second combined spark arrestor and muffler may include a spark arrestor portion and a muffler portion. For example, the first combined spark arrestor and muffler may include a spark arrestor portion proximate to the inlet 312. For example, exhaust gas may flow into the inlet 312 and into the spark arrestor portion of the first combined spark arrestor and muffler. The spark arrestor portion may be fluidly coupled to the muffler portion of the first combined spark arrestor and muffler, so that exhaust gas flows from the spark arrestor portion to the muffler portion. As an example, the spark arrestor portion may include a plurality of stator fins, which may separate carbon deposits from exhaust gas flow via centrifugal force. As another example, the muffler portion may include acoustic insulation to reduce exhaust gas noise. Internal components of the first combined spark arrestor and muffler will be described with respect to FIG. 6.

Further, FIGS. 4A and 4B show a first view 400 and a second view 450, respectively, of the combined spark arrestor and muffler assembly coupled to a locomotive frame 402. For example, the locomotive frame may provide structural support to a vehicle such as the locomotive 106 shown in FIG. 1. As shown by the reference axes 399, the first view 400 of FIG. 4A is an x-y planar view 400 of locomotive frame and the combined spark arrestor and muffler assembly. In particular, only the first combined spark arrestor and muffler is visible in the x-y planar view of FIG. 4A. A plurality of vehicle components may be coupled to the locomotive frame, such as components of an engine. As shown, the combined spark arrestor and muffler assembly described with respect to FIGS. 2 and 3 is coupled to the locomotive frame. For example, the locomotive frame includes a first attachment beam 404, the first attachment beam parallel to the x-axis with respect to the reference axes. To fixedly couple the combined spark arrestor and muffler assembly to the locomotive frame, a plurality of fasteners may be used. As shown, the first combined spark arrestor and muffler is coupled to the first attachment beam via the first mounting bracket and the second mounting bracket. In particular, the first mounting bracket is fixedly coupled to the first attachment beam, and the second mounting bracket is fixedly coupled to the first attachment beam. As shown in FIG. 2, the outlet of the first combined spark arrestor and muffler is coupled to the first exhaust stack.

Next, FIG. 4B shows the second view 450 of the combined spark arrestor and muffler assembly coupled to the locomotive frame. As indicated by the reference axes 399, the second view 450 is rotated about the y-axis such that foreshortened projections of each of the x- and z-axes are shown. In addition to the components shown in FIG. 4A, FIG. 4B shows a second attachment beam 412, which may be parallel to the first attachment beam 404 and the x-axis of the reference axes. Thus, as shown, the second combined spark arrestor and muffler is coupled to the second attachment beam via the third mounting bracket and the fourth mounting bracket (not shown). Similar to the first combined spark arrestor and muffler, the second combined spark arrestor and muffler is coupled to an exhaust stack (e.g., the second exhaust stack 210), through which exhaust gas may flow after passing through the second combined spark arrestor and muffler. In some examples, the combined spark arrestor and muffler assembly may include more or fewer attachment points, or may be fastened to the locomotive frame via welded joints, for example. Thus, the combined spark arrestor and muffler assembly may be fixedly coupled to the locomotive frame, so that the combined spark arrestor and muffler assembly may be securely held in place during engine operation without excessive vibration or disruption.

Further, each of the first combined spark arrestor and muffler and the second combined spark arrestor and muffler may include an external sliding joint and an internal sliding joint, each of the external sliding joint and the internal sliding joint configured to decrease thermal stresses at the joint. FIG. 5 shows a view 500 of the first combined spark arrestor and muffler, including an external sliding joint 324. For example, as indicated by the reference axes 399, view 500 is rotated about the y-axis such that foreshortened projections of each of the x- and z-axes are shown. For example, view 500 may be oriented similarly to view 300 with respect to the reference axes. Although FIG. 5 only shows the first combined spark arrestor and muffler, and does not show the second combined spark arrestor and muffler, the second combined spark arrestor and muffler may have a substantially identical external sliding joint as described for the first combined spark arrestor and muffler. For example, the external sliding joint may allow the combined spark arrestor and muffler to expand due to thermal forces, such as by allowing lateral movement of the hollow cylindrical body relative to a clamp sheet.

In particular, the external sliding joint may include an outer strap 336 and a ring plate 338, as shown in FIG. 5. The outer strap may be fastened by a spring-loaded fastener 328, so that the outer strap may expand due to thermal stresses. The outer strap may be in direct contact (e.g., face-sharing contact) with the ring plate. For example, the outer strap may be circular, and may extend circumferentially about the hollow cylindrical body of the first combined spark arrestor and muffler and pressed against outer surfaces of the ring plate. Further, a plurality of braces 340 may reinforce the external sliding joint to control the expansion direction. For example, the spring-loaded fastener may be pre-loaded to a pre-determined load based on a predicted amount of thermal expansion during engine operation. For example, the external sliding joint may allow the hollow cylindrical body to slide along the central axis 398 in response to thermal stresses.

Further, an internal sliding joint between an outer shell (e.g., the hollow cylindrical body of the first combined spark arrestor and muffler) and a perforated pipe may further reduce thermal stress due to expansion. Thus, FIG. 6 shows a schematic cross-sectional view 600 of the first combined spark arrestor and muffler, including the internal sliding joint. View 600 is a cross-sectional view planar view in the x-y plane as shown by the reference axes 399. For example, the cut plane for the cross-sectional view 600 may be parallel to the x-y plane of the reference axes, and may bisect the first combined spark arrestor and muffler. In particular, the cut plane may include the central axis 398. As shown in FIG. 6, the first combined spark arrestor and muffler includes a muffler portion 610 and a spark arrestor portion 612. For example, exhaust gas may enter the first combined spark arrestor and muffler via the inlet, may flow through the spark arrestor portion, flow through the muffler portion, and exit the first combined spark arrestor and muffler via the outlet. As shown, the spark arrestor portion may include a plurality of stator fins 602. For example, the plurality of stator fins may generate centrifugal forces in the exhaust gas flow, which may remove at least a portion of carbon deposits and burning matter from the exhaust gas.

As shown, the muffler portion may include acoustic insulation 614, which may reduce exhaust gas noise. Further, the muffler portion may include a joint 616 for changing the direction of exhaust gas flow, which may decrease exhaust gas temperature and exhaust gas noise. In particular, an internal cavity of the muffler portion may include a first cylindrical portion 606 and a second cylindrical portion 608. As an example, a central axis of the first cylindrical portion is perpendicular to a central axis of the second cylindrical portion. In particular, the first cylindrical portion shares a central axis with the combined spark arrestor and muffler, such that the central axis of the first cylindrical portion is perpendicular to the central axis 398. In particular, the central axis of the second cylindrical portion is central axis 699, which may be parallel with the y-axis with respect to the reference axes. As such, exhaust gas flowing into the muffler portion may flow substantially parallel to the central axis 398 while in the first cylindrical portion. However, as the exhaust gas passes through the joint, the exhaust gas direction may change, so that the exhaust gas direction is substantially parallel to the central axis 699 while in the second cylindrical portion. As another example, an exhaust gas inlet face 620 may be perpendicular to an exhaust gas outlet face 622. For example, the exhaust gas inlet face may be parallel to the y-z plane with respect to the reference axes, while the exhaust gas outlet face may be parallel to the x-z plane with respect to the reference axes.

Further, each of the first cylindrical portion and the second cylindrical portion of the muffler portion may be a perforated pipe. To couple the hollow cylindrical body of the first combined spark arrestor and muffler to the perforated pipe, an internal sliding joint 604 may be provided. For example, the internal sliding joint 604 may allow the perforated pipe to slide with respect to the hollow cylindrical body due to thermal expansion, which may decrease thermal stresses on the first combined spark arrestor and muffler. In particular, the first cylindrical portion may be coupled to a truncated cone portion 624, which may slidably fit in the internal sliding joint. For example, the truncated cone portion may be configured so that the muffler portion may slide relative to the spark arrestor portion with respect to the x-axis of the reference axes 399. Including the internal sliding joint may reduce thermal stresses on components of the first combined spark arrestor and muffler, such as by allowing free expansion.

Next, FIG. 7 shows a view 700 of the first combined spark arrestor and muffler. As indicated by the reference axes 399, view 700 is rotated about the y-axis so that foreshortened projections of each of the x- and z-axes are shown. In particular, view 700 may be rotated by approximately 90 degrees about the y-axis of the reference axes with respect to view 300 of FIG. 3. As shown in FIG. 7, the spark tray 320 may include a retractable drawer 702. The retractable drawer may be configured such that the retractable drawer may slide out of the spark tray for cleaning. For example, during engine operation, the spark arrestor portion of the first combined spark arrestor and muffler may remove carbon deposits from the exhaust gas. The removed carbon deposits may be collected in the spark tray. In this way, the retractable drawer may be configured to collect the carbon deposits. For example, the retractable drawer may be coupled to the spark tray via a sliding bracket or a bearing, which may allow the retractable drawer to slide in and out of the spark tray. A locking mechanism may prevent the retractable drawer from opening during engine operation, for example.

Further, to illustrate the operation of the spark tray, FIG. 8 shows a cross-sectional view 800 of the first combined spark arrestor and muffler, including the spark tray. As indicated by the reference axes 399, view 800 is rotated about the y-axis so that foreshortened projections of each of the x- and z-axes are shown. For example, view 800 may be further rotated about the y-axis with respect to the reference axes. Further, view 800 includes a cross-sectional cut through the first combined spark arrestor and muffler. The cut plane may be parallel to the y-z axis with respect to the reference axes, and may be perpendicular to the central axis of the first combined spark arrestor and muffler. As elaborated above, the spark tray may collect carbon deposits and other burning matter from the exhaust. The plurality of stator fins (not shown in FIG. 8) may produce centrifugal forces in the exhaust gas flow. For example, the plurality of stator fins may generate at least partially circular flow in the spark arrestor portion, and centrifugal forces may differentially affect larger carbon deposits and particular matter, causing it to flow through a spark flap 804. For example, the spark flap may couple the spark arrestor portion to the spark tray, so that carbon deposits and particulate matter fall into the spark tray. In this way, the spark arrestor portion of the first combined spark arrestor and muffler may reduce carbon deposits and other burning matter in the exhaust gas.

Further, a drain port may eliminate excess and/or unwanted fluid, such as rain, from a combined spark arrestor and muffler assembly. For example, FIG. 9 shows a schematic cross-sectional view 900 of the drain port shown in FIG. 3. As an example, each of the first combined spark arrestor and muffler and the second combined spark arrestor and muffler may include a drain collector. As shown, rain and other liquid may flow from the first cylindrical portion into the drain port via a flow path 902. The drain port may allow rain and other liquids to flow out of the combined spark arrestor and muffler assembly, reducing component degradation.

Figure 10:
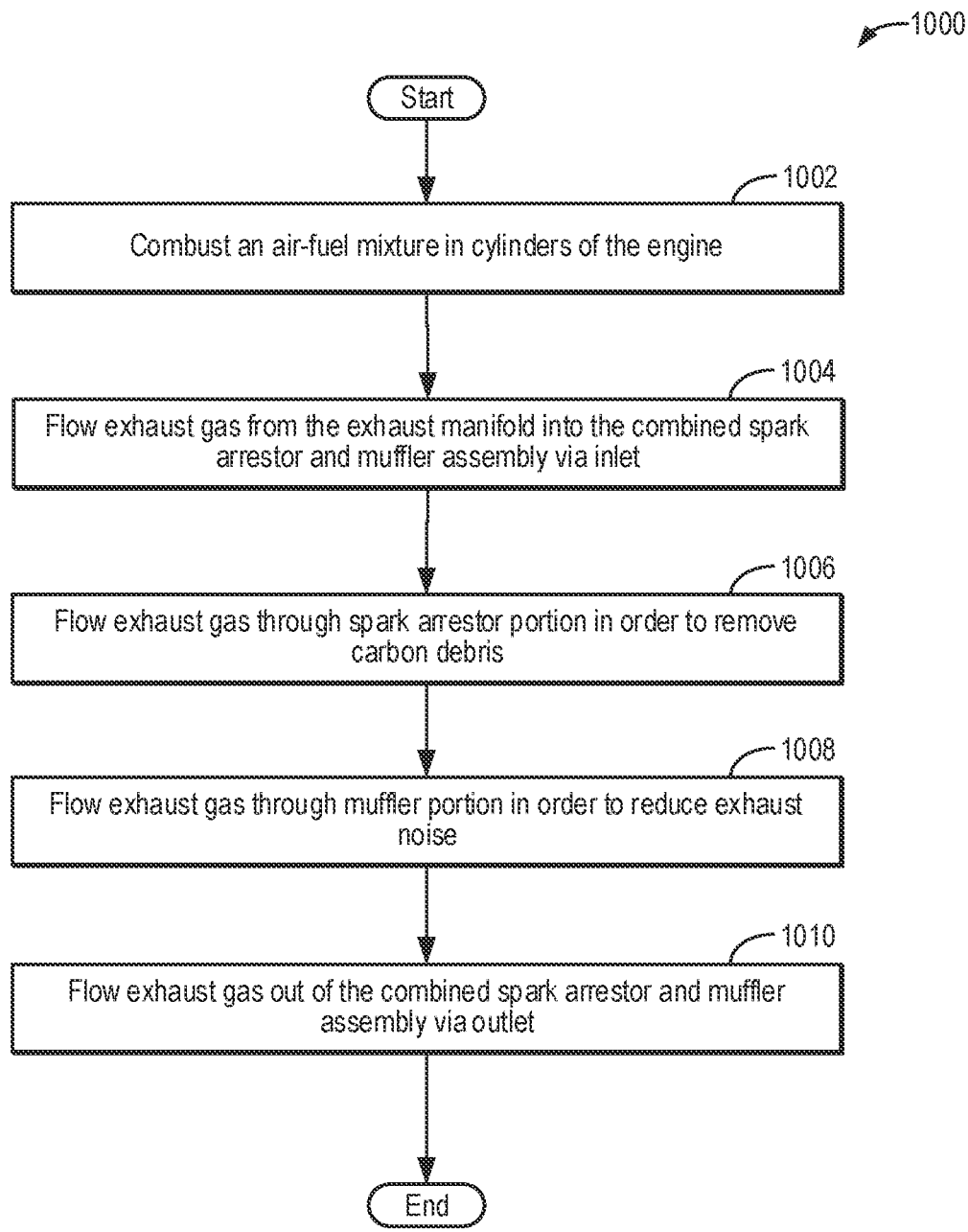
FIG. 10 shows a method for operating the combined spark arrestor and muffler assembly to reduce exhaust gas carbon deposits and exhaust gas noise.

Next, FIG. 10 provides a method 1000 for flowing exhaust gas through a combined spark arrestor and muffler assembly, such as the combined spark arrestor and muffler assembly 202 introduced in FIG. 2. The combined spark arrestor and muffler assembly may be included in an exhaust system of an engine, such as engine system shown in FIG. 1. At least portions of method 1000 may be executed by a controller, such as the controller 110 shown in FIG. 1, based on instructions stored in non-transitory memory.

At 1002, method 1000 includes combusting an air-fuel mixture in cylinders of the engine. For example, fuel from a fuel system may be delivered to the cylinders via fuel injectors (e.g., fuel injector 107 of FIG. 1), where the fuel is mixed with air, the amount of air controlled by adjusting an opening of an intake valve (e.g., intake valve 103 of FIG. 1). In one example, the amount of fuel to be delivered may be empirically determined and stored in a predetermined lookup table or function, which may be indexed to engine operating conditions, such as engine speed and load, among other engine operating conditions (such as a desired air-fuel ratio). The controller may determine a pulse-width of a control signal to send to a fuel injector actuator corresponding to the determined amount of fuel to be delivered. The resulting air-fuel mixture may be ignited (e.g., via spark plugs or compression ignition), generating power via expanding exhaust gases. After combustion, exhaust gases may be vented from the cylinder into an exhaust system.

At 1004, method 1000 includes flowing the exhaust gases from the exhaust manifold into the combined spark arrestor and muffler assembly via an inlet. As described above with respect to FIG. 2, the exhaust gases from combustion in an engine (e.g., engine 201 of FIG. 2) may be flowed through an exhaust system to the combined spark arrestor and muffler assembly. Further, the combined spark arrestor and muffler assembly may have a twin configuration, such as shown in FIGS. 2 and 3, so that the combined spark arrestor and muffler assembly includes two inlets, with a first inlet directing exhaust gas to a first combined spark arrestor and muffler, and a second inlet directing exhaust gas to a second combined spark arrestor and muffler.

At 1006, method 1000 includes flowing the exhaust gases through a spark arrestor portion of the combined spark arrestor and muffler assembly to remove carbon debris. As stated above, the combined spark arrestor and muffler assembly may have a twin configuration, such as that the first combined spark arrestor and muffler has a first spark arrestor portion and the second combined spark arrestor and muffler has a second spark arrestor portion. For example, each of the first spark arrestor portion and the second spark arrestor portion may include a plurality of stator fins, which may trap carbon deposits via centrifugal force. For example, the stator fins may create a circular airflow, which may generate centrifugal force in the exhaust gas. Further, the centrifugal force may cause carbon deposits above a threshold size to remain in the first and second spark arrestor portions. For example, carbon deposits from the first and second spark arrestor portions may be respectively trapped in spark trays of the first and second combined spark arrestor and muffler. The spark trays may be cleaned periodically to remove carbon deposits.

At 1008, method 1000 includes flowing the exhaust gases through a muffler portion of the combined spark arrestor and muffler assembly to reduce exhaust noise. For example, the muffler portion of the combined spark arrestor and muffler assembly may include insulation and/or resonance chambers for decreasing exhaust gas noise. In particular, the first combined spark arrestor and muffler of the combined spark arrestor and muffler assembly may have a first muffler portion, and the second combined spark arrestor and muffler of the combined spark arrestor and muffler assembly may have a second muffler portion. For example, the hot, high-pressure exhaust may generate sound pressure, which may generate noise. Materials for acoustic insulation, such as acoustic packing, may be included in each of the first muffler portion and the second muffler portion to reduce exhaust noise.

At 1010, method 1000 includes flowing the exhaust gases out of the combined spark arrestor and muffler assembly via an outlet. For example, after carbon deposits in the exhaust gas are decreased via the spark arrestor portion of the combined spark arrestor and muffler assembly, and exhaust gas noise is decreased via the muffler portion of the combined spark arrestor and muffler assembly, the exhaust gas may flow out of the outlet. For example, each of the first combined spark arrestor and muffler and the second combined spark arrestor and muffler may include an outlet through which exhaust gas may flow. For example, each outlet may be coupled to an exhaust stack, which may direct exhaust gas away from the engine.

In this way, a vehicle, such as a locomotive vehicle, may be provided with a spark arrestor and a muffler without the additional cost, complexity, and weight of including two additional components. For example, by combining a spark arrestor function and a muffler function in a single combined spark arrestor and muffler assembly, a component weight may be reduced, as well as a number of connectors utilized, which may reduce the cost and complexity. By providing both a spark arrestor function and a muffler function, vehicle exhaust may include lower levels of carbon deposits, and exhaust gas noise may be decreased. Further, by providing an external sliding joint and an internal sliding joint, thermal stresses on the combined spark arrestor and muffler assembly may be reduced. The technical effect of providing a combined spark arrestor and muffler assembly is that an amount of carbon debris and exhaust gas noise for a vehicle is reduced.

An embodiment of a system includes a first combined housing, including a spark arrestor portion, the spark arrestor portion including a plurality of stator fins, and a muffler portion, the muffler portion including acoustic packing, wherein the muffler portion is fluidically coupled to the spark arrestor portion via a first sliding joint and a second sliding joint. In one embodiment of the system, the first combined housing includes an internal cavity, the plurality of stator fins positioned therein, a cylindrical outer casing, a spark collector coupled to the cylindrical outer casing, and a drain port fluidically coupling the internal cavity to an external surface of the cylindrical outer casing. In one embodiment of the system, the first combined housing includes an exhaust gas inlet positioned at a first end of the cylindrical outer casing, the exhaust gas inlet extending between the external surface of the cylindrical outer casing and the internal cavity, and an exhaust gas outlet positioned at a second end of the cylindrical outer casing, the exhaust gas outlet extending between the external surface of the cylindrical outer casing and the internal cavity, a face of the exhaust gas outlet perpendicular to a face of the exhaust gas inlet. In one embodiment of the system, the acoustic packing is positioned between the internal cavity and an internal surface of the cylindrical outer casing. In one embodiment of the system, the cylindrical outer casing is coupled to a clamp sheet via the first sliding joint, the first sliding joint including at least one pre-loaded spring. In one embodiment of the system, the muffler portion includes a perforated pipe, the perforated pipe coupled to the cylindrical outer casing via the second sliding joint. In one embodiment of the system, the spark collector includes an outer box fixedly coupled to the cylindrical outer casing and an inner box slidably coupled to the outer box. In one embodiment of the system, the system further includes a second combined housing, the second combined housing including another spark arrestor portion and another muffler portion, a central axis of the first combined housing parallel to a central axis of the second combined housing. In one embodiment of the system, the first combined housing is coupled to an exhaust system of a locomotive engine.

An embodiment of an apparatus includes a cylindrical casing including an internal cavity, the internal cavity including a first cylindrical portion and a second cylindrical portion, the first cylindrical portion perpendicular to the second cylindrical portion, an exhaust gas inlet extending between the internal cavity and an exterior surface of the cylindrical casing, the exhaust gas inlet positioned on a first end of the cylindrical casing, an exhaust gas outlet extending between the internal cavity and the exterior surface of the cylindrical casing, the exhaust gas outlet positioned on a second end of the cylindrical casing, a plurality of stator fins positioned within the first cylindrical portion of the internal cavity, and an insulating material positioned radially around at least the second cylindrical portion of the internal cavity. In one embodiment of the apparatus, a spark tray extends between the first cylindrical portion and the exterior surface of the cylindrical casing. In one embodiment of the apparatus, a face of the exhaust gas inlet is perpendicular to a face of the exhaust gas outlet. In one embodiment of the apparatus, the apparatus further includes an external sliding joint between the cylindrical casing and a clamp sheet, the external sliding joint including a spring-loaded strap. In one embodiment of the apparatus, the apparatus further includes an internal sliding joint between the cylindrical casing and the first cylindrical portion of the internal cavity.

An embodiment of a system includes an exhaust gas passage extending between an exhaust gas inlet and an exhaust gas outlet, a face of the exhaust gas inlet perpendicular to a face of the exhaust gas outlet, the exhaust gas passage including a plurality of stator fins, and at least a portion of the exhaust gas passage encased in an insulating material, a spark tray coupled to the exhaust gas passage, and a drain port coupling an internal surface of the exhaust gas passage to an external surface of the exhaust gas passage. In one embodiment of the system, the system further includes an external sliding joint, the external sliding joint including a ring plate welded to the external surface of the exhaust gas passage, and an outer strap in direct contact with the ring plate, the outer strap coupled to a pre-loaded spring. In one embodiment of the system, the system further includes an internal sliding joint, the internal sliding joint including a perforated pipe extending within the exhaust gas passage, and a truncated cone, a first end of the truncated cone coupled to the perforated pipe, and a second end of the truncated cone coupled to a wall of the exhaust gas passage. In one embodiment of the system, the spark tray includes a box fixedly coupled to the exhaust gas passage, and a sliding drawer removable from the box. In one embodiment of the system, the exhaust gas passage is coupled to an exhaust system of an engine. In one embodiment of the system, the engine is a locomotive engine.

An embodiment of a method includes flowing exhaust gas from an exhaust manifold of an engine into a combined spark arrestor and muffler assembly via an exhaust gas inlet, flowing the exhaust gas through a first portion of the combined spark arrestor and muffler assembly, the first portion of the combined spark arrestor and muffler assembly including a plurality of stator fins, flowing the exhaust gas through a second portion of the combined spark arrestor and muffler assembly, the second portion of the combined spark arrestor and muffler assembly including insulating material, and the second portion of the combined spark arrestor and muffler assembly coupled to the first portion of the combined spark arrestor and muffler assembly via an internal sliding joint, and flowing the exhaust gas out of the combined spark arrestor and muffler assembly via an exhaust gas outlet, the exhaust gas outlet perpendicular to the exhaust gas inlet. In one embodiment of the method, the method further includes combusting an air-fuel mixture in cylinders of the engine, and flowing the exhaust gas from the cylinders to the exhaust manifold. In one embodiment of the method, flowing the exhaust gas through the first portion of the combined spark arrestor and muffler assembly includes collecting carbon deposits in a spark collector tray coupled to the combined spark arrestor and muffler assembly. In one embodiment of the method, flowing the exhaust gas through the second portion of the combined spark arrestor and muffler assembly includes flowing the exhaust gas through a 90 degree turn in the second portion of the combined spark arrestor and muffler assembly. In one embodiment of the method, the combined spark arrestor and muffler assembly includes a spring-loaded strap coupling a body of the combined spark arrestor and muffler assembly to a clamp sheet, the clamp sheet fixedly coupled to a frame of a vehicle. In one embodiment of the method, the body of the combined spark arrestor and muffler assembly includes a housing, the housing enclosing each of the first portion of the combined spark arrestor and muffler assembly and the second portion of the combined spark arrestor and muffler assembly.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a first combined housing, comprising:
        a spark arrestor portion, the spark arrestor portion including a plurality of stator fins; and
        a muffler portion, the muffler portion including acoustic packing, wherein the muffler portion is fluidically coupled to the spark arrestor portion via a first sliding joint and a second sliding joint.

2. The system of claim 1, wherein the first combined housing comprises:
    an internal cavity, the plurality of stator fins positioned therein;
    a cylindrical outer casing;
    a spark collector coupled to the cylindrical outer casing; and
    a drain port fluidically coupling the internal cavity to an external surface of the cylindrical outer casing.

3. The system of claim 2, wherein the first combined housing comprises:
    an exhaust gas inlet positioned at a first end of the cylindrical outer casing, the exhaust gas inlet extending between the external surface of the cylindrical outer casing and the internal cavity; and
    an exhaust gas outlet positioned at a second end of the cylindrical outer casing, the exhaust gas outlet extending between the external surface of the cylindrical outer casing and the internal cavity, a face of the exhaust gas outlet perpendicular to a face of the exhaust gas inlet.

4. The system of claim 2, wherein the acoustic packing is positioned between the internal cavity and an internal surface of the cylindrical outer casing.

5. The system of claim 2, wherein the cylindrical outer casing is coupled to a clamp sheet via the first sliding joint, the first sliding joint including at least one pre-loaded spring.

6. The system of claim 2, wherein the muffler portion includes a perforated pipe, the perforated pipe coupled to the cylindrical outer casing via the second sliding joint.

7. The system of claim 2, wherein the spark collector includes an outer box fixedly coupled to the cylindrical outer casing and an inner box slidably coupled to the outer box.

8. The system of claim 1, further comprising a second combined housing, the second combined housing including another spark arrestor portion and another muffler portion, a central axis of the first combined housing parallel to a central axis of the second combined housing.

9. The system of claim 1, wherein the first combined housing is coupled to an exhaust system of a locomotive engine.

\* \* \* \* \*